(12) United States Patent
Usui et al.

(10) Patent No.: US 7,998,241 B2
(45) Date of Patent: Aug. 16, 2011

(54) METHOD FOR RECOVERING RHODIUM

(75) Inventors: Shoujirou Usui, Oita (JP); Yoshio Ito, Oita (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 551 days.

(21) Appl. No.: 12/068,093

(22) Filed: Feb. 1, 2008

(65) Prior Publication Data

US 2008/0236337 A1 Oct. 2, 2008

(30) Foreign Application Priority Data

Mar. 30, 2007 (JP) ................................. 2007-090629

(51) Int. Cl.
*C22B 61/00* (2006.01)
(52) U.S. Cl. .......................................... 75/392; 75/101
(58) Field of Classification Search ............. 75/392, 75/101
See application file for complete search history.

(56) References Cited

U.S. PATENT DOCUMENTS

| | | | |
|---|---|---|---|
| 3,672,875 A | 6/1972 | MacCragh | |
| 4,022,443 A | 5/1977 | Belt et al. | |
| 4,105,442 A * | 8/1978 | Fieberg et al. | ................... 75/720 |
| 4,390,366 A | 6/1983 | Lea et al. | |
| 4,397,689 A | 8/1983 | Lea et al. | |
| 4,407,738 A * | 10/1983 | Eskinazi et al. | .............. 502/334 |

FOREIGN PATENT DOCUMENTS

| | | |
|---|---|---|
| EP | 0 048 103 A1 | 3/1982 |
| EP | 0 049 567 A1 | 4/1982 |
| JP | 1-30896 B2 | 6/1989 |
| JP | 2006-265677 A | 10/2006 |
| JP | 2007-154252 A | 6/2007 |
| JP | 2007-270228 A | 10/2007 |

OTHER PUBLICATIONS

NPL: Machine translation of JP-2006265677 Oct. 2006.*
Paretsky, V.M et al. "Hydrometallurgical Method for Treating Special Alloys, Jewelry, Electronic and Electrotechnical Scrap." State Research Center of Russian Federation, 2004, p. 713-721. XP009098610.

* cited by examiner

*Primary Examiner* — Roy King
*Assistant Examiner* — Jie Yang
(74) *Attorney, Agent, or Firm* — Birch, Stewart, Kolasch & Birch, LLP

(57) ABSTRACT

The present invention provides a method for recovering rhodium sponge in high yield from ammonium hexachloro rhodate solution. The method comprises adding formic acid to ammonium hexachloro rhodate solution to reduce the rhodate, recovering reduced rhodium as rhodium black, and calcining the rhodium black under hydrogen atmosphere without water-washing to obtain rhodium sponge.

2 Claims, 1 Drawing Sheet

$(NH_4)_3[RhCl_6]$ solution

↓ ← formic acid

| filtration |

↓ rhodium black

↓

| no water-washing |

↓

| reduction calcining | ← 750~850°C

↓ rhodium sponge

METHOD FOR RECOVERING RHODIUM

FIELD OF THE INVENTION

The present invention relates to technology for recovering rhodium sponge from ammonium hexachloro rhodate solution in high yield by adding formic acid to the solution to recover rhodium black, then calcining it under hydrogen atmosphere.

BACKGROUND OF THE INVENTION

Japanese examined patent publication No. H01-30896 "Noble Metal Extraction from Noble Metal-Containing Solution" discloses technology for recovering rhodium as rhodium black from ammonium hexachloro rhodate solution by adding formic acid to the solution.

However, it does not disclose a method for obtaining rhodium sponge from ammonium hexachloro rhodate solution in high yield.

The inventors have found out that rhodium sponge can be obtained in high yield without sacrificing impurity level by omitting the water-washing of rhodium black in a method for recovering rhodium sponge from ammonium hexachloro rhodate solution comprising reducing the rhodate with formic acid to obtain rhodium black and then calcining the rhodium black under hydrogen atmosphere.

Problems to be Solved by the Invention

The object of the invention is to provide a method for recovering rhodium sponge from ammonium hexachloro rhodate solution in high yield.

Means for Solving the Problems

The inventors have made the following invention to solve the aforementioned problem.
(1) a method for recovering rhodium in high yield comprising adding formic acid to ammonium hexachloro rhodate solution to reduce the rhodate, recovering reduced rhodium as rhodium black, and calcining the rhodium black under hydrogen atmosphere without water-washing to obtain rhodium sponge having low impurity level.

Advantageous Effect of the Invention

According to the method for recovering rhodium of the invention,
(1) rhodium can be recovered in high yield since rhodium black is calcined without water-washing, thus preventing dissolution loss of rhodium caused by the water-washing;
(2) rhodium sponge can be obtained having as low impurity level as in the case where water-washing is conducted.

BEST MODE FOR CARRYING OUT THE INVENTION

The invention will be explained in detail hereinafter.
A method for obtaining rhodium metal comprising adding formic acid to ammonium hexachloro rhodate solution to reduce the rhodate, recovering reduced rhodium as rhodium black, and calcining the rhodium black under hydrogen atmosphere has been known. However, hydrochloric acid and formic acid are deposited on the rhodium black recovered by filtration from the post-formic acid reducing solution. Therefore, when the rhodium black is calcined without any additional process, the rhodium may be contaminated by the corrosion of the firing furnace in case where the equipment is a SUS-made furnace or the like. In addition, there was a concern that chlorine might remain in the calcined rhodium. Therefore, it has been thought that rhodium black needs to be water-washed before the calcining.

Rhodium black in itself is not dissolved by water-washing. However, the inventors have found out that a part of rhodium black which is recovered by the filtration in the aforementioned method is dissolved when it is water-washed, thereby causing a loss of rhodium.

It is believed that re-crystallized ammonium hexachloro rhodate, which is soluble in water, is mixed in a portion of the filtrand and causes rhodium loss during the water-washing.

The dissolution loss of rhodium caused during this water-washing is around 10%.

Furthermore, in the method in which rhodium black is recovered by formic acid reduction and filtration, the rhodium loss into the filtrate can be decreased by recovering rhodium also as ammonium hexachloro rhodate by filtration. In this way, the dissolution loss of rhodium due to water-washing of rhodium black can be cut to zero by calcining rhodium black under hydrogen atmosphere without water-washing.

In addition, although there was a concern that ammonium hexachloro rhodate might mix in the rhodium black, thereby increasing the impurity level of the recovered rhodium sponge if the water-washing is omitted, it has turned out that, rhodium sponge obtained without water-washing can have as low impurity level as in the case the where water-washing is conducted.

There are two reasons for the result. Firstly, since the concentration of metals other than rhodium (e.g., Pt, Pd, Ru, Ir, Cr, Fe, Ni, Al, Cu, Pb, and Ag) contained in the solution before the formic acid reduction is sufficiency low, i.e., equal to or less than 1 mg/l, the amount of impurities mixed from post-reduction solution deposited on the rhodium black is small. Secondly, since hydrochloric acid mixed as deposited solution on the rhodium black evaporates upon calcining at 750-850° C. under reduction atmosphere, it does not remain in rhodium sponge.

The impurities mixed into rhodium by the corrosion of the equipment can be prevented by using materials such as alumina in the area where rhodium may be contaminated.

Figure 1:
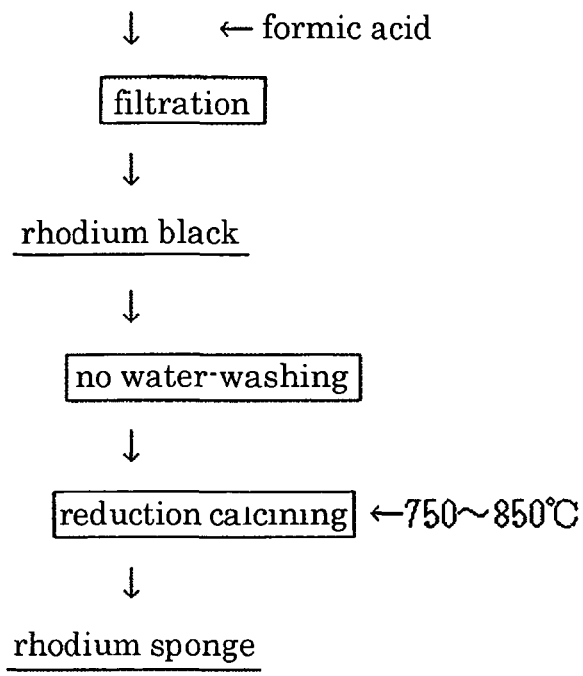
FIG. 1 shows a process flow of an example in accordance with the invention.
Figure 2:
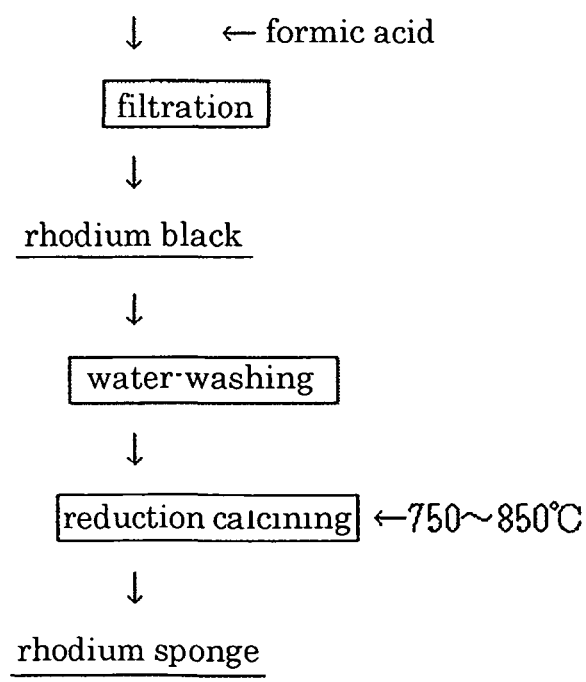
FIG. 2 shows a process flow of a comparative example.

The invention will be explained in detail with reference to the flow sheets shown in FIGS. 1 and 2. The solutions were analyzed by an ICP emission spectroscope analyzer and the rhodium sponges were analyzed by a glow discharge mass spectroscope for an example of the invention and comparative examples.

EXAMPLES

Table 1 shows the composition of the Rh-containing solution used in this example.

TABLE 1

| Concentration mg/L | | | | | | | | | | | |
|---|---|---|---|---|---|---|---|---|---|---|---|
| Rh | Pt | Pd | Ru | Ir | Cr | Fe | Ni | Al | Cu | Pb | Ag |
| 52643 | <1 | <1 | <1 | <1 | <1 | <1 | <1 | <1 | <1 | <1 | <1 |

107 mL of formic acid, which corresponds to 3 reducing equivalents with respect to Rh, was added to 1 L of the solution shown in Table 1, and the solution was heated and stirred at 90° C. The solution was allowed to cool to room temperature before it was filtered. As a result, 99.2% of Rh was recovered as Rh black while Rh contained in the filtrate was small and merely 0.4 g/L.

Without water washing, the Rh black was then calcined for 2 hours at 800° C. under reduction atmosphere consisting of 5% hydrogen and 95% argon to obtain rhodium sponge. Incidentally, the calcining was conducted in a tubular furnace made of alumina to prevent contamination with iron or the like.

The amount of rhodium sponge recovered was 51.9 g and the yield was as much as 98.7%. The amount of impurities was very small and merely 162 ppm.

Table 2 shows the aforementioned values.

TABLE 2

|  | Rh amount in pre-reduction solution (g) | post-reduction filtrate Rh amount (g) | post-reduction filtrate yield (%) | water-washing of Rh black | post-reduction filtrate Rh amount (g) | post-reduction filtrate yield (%) | recovered Rh sponge weight (g) | recovered Rh sponge yield (%) | total impurity concentration in Rh sponge |
|---|---|---|---|---|---|---|---|---|---|
| Example of the invention | 52.6 | 0.4 | 0.8 | no | 0 | 0 | 51.9 | 98.7 | 162 |
| Comparative Example | 52.6 | 0.4 | 0.8 | yes | 2.7 | 9.5 | 46.8 | 89.0 | 204 |

Table 3 shows the composition of the impurities.

TABLE 3

| atomic number |  | Example of the invention without water-washing of Rh black | Comparative Example purified water repulping of Rh black |
|---|---|---|---|
| 3 | Li | <1 | <1 |
| 4 | Be | <1 | <1 |
| 5 | B | <1 | <1 |
| 11 | Na | 2 | <1 |
| 12 | Mg | 2 | <1 |
| 13 | Al | 17 | 16 |
| 14 | Si | 29 | 67 |
| 15 | P | 1 | 2 |
| 16 | S | <1 | <1 |
| 17 | Cl | 6 | 4 |
| 19 | K | <1 | <1 |
| 20 | Ca | 4 | 1 |
| 21 | Sc | <1 | <1 |
| 22 | Ti | <1 | <1 |
| 23 | V | <1 | <1 |
| 24 | Cr | 17 | <1 |
| 25 | Mn | <1 | <1 |
| 26 | Fe | 4 | 7 |
| 27 | Co | <1 | <1 |
| 28 | Ni | <1 | <1 |
| 29 | Cu | 22 | 29 |
| 30 | Zn | <1 | <1 |
| 31 | Ga | <1 | <1 |
| 32 | Ge | <1 | <1 |
| 33 | As | <1 | <1 |
| 34 | Se | <1 | <1 |
| 35 | Br | <1 | <1 |
| 37 | Rb | <1 | <1 |
| 38 | Sr | <1 | <1 |
| 39 | Y | <1 | <1 |
| 40 | Zr | 8 | <1 |
| 41 | Nb | <1 | <1 |
| 42 | Mo | <1 | <1 |
| 44 | Ru | 6 | 8 |
| 45 | Rh | <1 | <1 |
| 46 | Pd | <1 | <1 |
| 47 | Ag | <1 | <1 |
| 48 | Cd | <1 | <1 |
| 49 | In | <1 | 11 |
| 50 | Sn | <1 | <1 |
| 51 | Sb | <1 | 2 |
| 52 | Te | 35 | 46 |
| 53 | I | <1 | <1 |
| 55 | Cs | <1 | <1 |
| 56 | Ba | <1 | <1 |
|  | lanthanide series | <1 | <1 |
| 72 | Hf | <1 | <1 |
| 74 | W | <1 | <1 |
| 75 | Re | <1 | <1 |
| 76 | Os | <1 | <1 |
| 77 | Ir | <1 | <1 |
| 78 | Pt | 9 | 11 |
| 79 | Au | <1 | <1 |
| 80 | Hg | <1 | <1 |
| 81 | Tl | <1 | <1 |
| 82 | Pb | <1 | <1 |
| 83 | Bi | <1 | <1 |
| 90 | Th | <1 | <1 |
| 92 | U | <1 | <1 |
|  | total amount of impurities (ppm) | 162 | 204 |
|  | Rh amount (%) | 99.984 | 99.980 |

Comparative Example 1

107 mL of formic acid, which corresponds to 3 reducing equivalents with respect to Rh, was added to 1 L of the solution shown in Table 1, and the solution was heated and stirred at 90° C. The solution was allowed to cool to room temperature before it was filtered. As a result, 99.2% of Rh was recovered as Rh black while Rh contained in the filtrate was small and merely 0.4 g/L.

After that, the Rh black was washed with water.

In this process, the Rh loss into the filtrate was 2.7 g/L, i.e., 9.5%. After the water-washing, the Rh black was calcined for 2 hours at 800° C. under reduction atmosphere consisting of 5% hydrogen and 95% argon to obtain rhodium sponge.

The amount of rhodium sponge recovered was 46.8 g and the yield was 89.0%, substantially lower than the example of the invention. The amount of impurities was 204 ppm and substantially the same level as in the example of the invention.

Table 2 shows the aforementioned values.

Table 3 shows the composition of the impurities.

Comparative Example 2

When the calcining was conducted under the same condition as in the example of the invention except that a SUS-made tube was used, the rhodium sponge contained 40 ppm of iron, and a desired product could not be obtained.

What is claimed is:

1. A method for recovering rhodium in a yield of 98.7% or higher comprising:
    adding formic acid to ammonium hexachloro rhodate solution to reduce the rhodate,
    recovering reduced rhodium as rhodium black, and;
    calcining the rhodium black under hydrogen atmosphere without water washing to obtain rhodium sponge.

2. The method for recovering rhodium as claimed in claim 1, wherein the step of calcining the rhodium black is conducted in a tube made of alumina to prevent contamination with iron or the like.

* * * * *